(12) United States Patent
Hubbard

(10) Patent No.: US 7,101,598 B2
(45) Date of Patent: Sep. 5, 2006

(54) SELF ADHERING MEMBRANE FOR ROOFING APPLICATIONS

(75) Inventor: Michael J. Hubbard, Maumee, OH (US)

(73) Assignee: OM NOVA Solutions Inc., Fairlawn, OH (US)

( * ) Notice: Subject to any disclaimer, the term of this patent is extended or adjusted under 35 U.S.C. 154(b) by 61 days.

(21) Appl. No.: 10/153,132

(22) Filed: May 22, 2002

(65) Prior Publication Data

US 2003/0219564 A1    Nov. 27, 2003

(51) Int. Cl.
*B32B 9/00* (2006.01)
*B32B 33/00* (2006.01)

(52) U.S. Cl. ...................... 428/40.1; 428/141
(58) Field of Classification Search ............... 428/40.1, 428/40.3, 55, 61, 141, 192
See application file for complete search history.

(56) References Cited

U.S. PATENT DOCUMENTS

| | | | |
|---|---|---|---|
| 3,900,102 A * | 8/1975 | Hurst .................... 206/411 |
| 4,038,454 A | 7/1977 | Lehmann et al. |
| 4,091,135 A | 5/1978 | Tajima et al. |
| 4,539,344 A | 9/1985 | Van Ornum et al. |
| 4,656,062 A | 4/1987 | Harriett |
| 4,736,552 A * | 4/1988 | Ward et al. ............... 52/94 |
| 4,757,652 A * | 7/1988 | Kalkanoglu ............... 52/173 |
| 4,778,852 A | 10/1988 | Futamura |
| 4,910,059 A | 3/1990 | Sancaktar |
| 4,965,119 A | 10/1990 | Sancaktar |
| 4,978,703 A | 12/1990 | Ainsworth et al. |
| 5,162,436 A | 11/1992 | Davis et al. |
| 5,256,228 A | 10/1993 | Davis et al. |
| 5,286,798 A | 2/1994 | Davis et al. |
| 5,322,724 A | 6/1994 | Levens |
| 5,370,755 A | 12/1994 | Davis et al. |
| 5,389,715 A | 2/1995 | Davis et al. |
| 5,468,550 A * | 11/1995 | Davis et al. .............. 428/327 |
| 5,496,615 A * | 3/1996 | Bartlett et al. ............ 428/144 |
| 5,516,829 A | 5/1996 | Davis et al. |
| H1735 H * | 6/1998 | Hansen et al. ............. 524/505 |
| 6,004,645 A * | 12/1999 | Hubbard .................... 428/57 |
| 6,080,458 A | 6/2000 | Russell et al. |
| 6,235,365 B1 * | 5/2001 | Schaughency et al. ...... 428/40.1 |
| 6,696,125 B1 | 2/2004 | Zanchetta et al. |
| 2003/0008094 A1 * | 1/2003 | Zickell .................... 428/40.1 |
| 2003/0195287 A1 | 10/2003 | Fisher |

FOREIGN PATENT DOCUMENTS

| | | | |
|---|---|---|---|
| EP | 352 394 | * | 1/1990 |
| JP | 05-306561 | * | 11/1993 |
| JP | 407189437 | * | 7/1995 |
| JP | 08-337764 | | 12/1996 |
| JP | 2003113662 | * | 4/2003 |
| WO | WO 98/56866 | | 12/1998 |
| WO | WO 99/22935 | * | 5/1999 |

OTHER PUBLICATIONS

RD 226007, Feb. 1983, RD, Unknown.*

* cited by examiner

*Primary Examiner*—William P. Watkins, III
*Assistant Examiner*—Patricia L Nordmeyer
(74) *Attorney, Agent, or Firm*—Jagtiani + Guttag

(57) ABSTRACT

A preformed, self adhering single ply roofing membrane including a water impermeable membrane; a pressure sensitive, hot melt adhesive adhered to one side of the water impermeable membrane, and a release liner on the side of the pressure sensitive, hot melt adhesive opposite of the water impermeable membrane.

21 Claims, 1 Drawing Sheet

SELF ADHERING MEMBRANE FOR ROOFING APPLICATIONS

BACKGROUND OF THE INVENTION

1. Field of the Invention

The present invention relates generally to a self adhering membrane for roofing applications. More particularly, the present invention relates to a preformed self adhering single ply roofing membrane including a pressure sensitive, hot melt adhesive adhered to one side of a water impermeable membrane.

2. Description of the Related Art

A roofing system generally includes a roof deck which is considered the structural supporting surface of a building extending between the surrounding exterior walls of the building. The roof deck may be constructed from plywood, metal decking or concrete or any other suitable material. Depending upon the construction, the roof deck may extend over the surrounding exterior walls or the roof deck may stop short of the exterior walls thereby forming a parapet wall, i.e., a low retaining wall at the edge of the roof deck. If desired, the roofing system may also include an insulation barrier formed from polyisocyanarate or any other suitable material applied over the roof deck.

To make the roof deck and building weather resistant a single-ply membrane roof is installed over the roof deck. The single-ply membrane roof refers to a water impermeable single sheet of polymeric material. The membrane roof has heretofore been installed on the roof deck using a variety of different methods.

For example, the field or interior of the membrane roof may be held to the roof deck by the use of ballast and/or penetrating or non-penetrating fastener means as known in the art. An example of a penetrating fastener means for retaining the field of a membrane roof installed to a roof deck is by utilizing a plurality of small, circular, metal plates having a hole in the center and a roofing screw or other suitable fastener. In order to anchor the membrane roof, the small, circular, metal plates are spaced apart in rows on the membrane roof and the fastener is driven through the hole in each plate, the membrane roof, any insulation material and then into the roof deck. The metal plates are then covered by overlapping roof membrane. An example of a non-penetrating fastener means would include totally adhering the field of the membrane roof to the roof deck.

Although the many known variations for attaching a membrane roof to a roof deck have been proven to perform satisfactorily under certain conditions, further improvements on attaching a membrane roof to a roof deck are desired.

The present invention is directed to a self adhering membrane for roofing applications. More particularly, the present invention relates to a preformed self adhering single ply roofing membrane including a pressure sensitive, hot melt adhesive adhered to one side of a water impermeable membrane for application to a roofing deck and/or a parapet wall to form a water impermeable roofing membrane.

SUMMARY OF THE INVENTION

Briefly, the present invention relates to a preformed single ply roofing membrane including a water impermeable membrane; a pressure sensitive, hot melt adhesive adhered to one side of the water impermeable membrane, wherein the pressure sensitive adhesive is free of a curing additive; and a release liner on the side of the pressure sensitive, hot melt adhesive opposite of the water impermeable membrane.

BRIEF DESCRIPTION OF THE DRAWINGS

Further features of the present invention, as well as the advantages derived therefrom, will become clear from the following detailed description made with reference to the drawings in which.

DESCRIPTION OF THE PREFERRED EMBODIMENT

Figure 1:
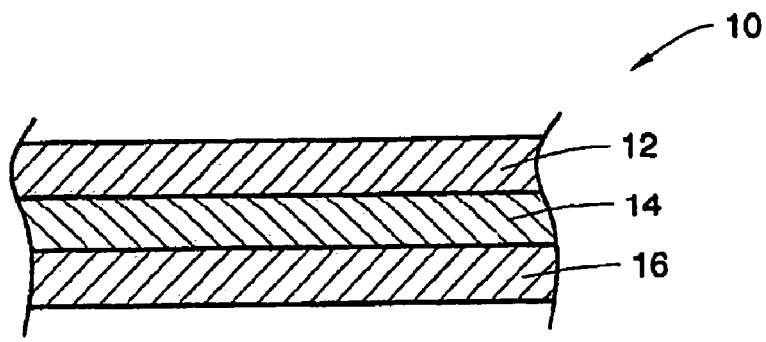
FIG. 1 is a cross sectional view of a preformed roofing membrane in accordance with one aspect of the present invention.

Referring the figures, wherein like reference characters represent like elements, there is shown a preformed self adhering roofing membrane 10 in accordance with the present invention. As noted, the preformed self adhering roofing membrane 10 includes a substrate sheet of water impermeable membrane 12, a pressure sensitive, hot melt adhesive 14 adhered to one side of the water impermeable membrane, and a release liner 16 on the side of the pressure sensitive, hot melt adhesive opposite of the water impermeable membrane.

The preformed self adhering roofing membrane 10 is securely attached to a roof substrate comprising a roof deck or parapet wall or curb to form a water impervious structure. The roof deck and/or parapet wall and/or curb may be constructed from plywood, metal decking or concrete or any other suitable material. On existing construction, the self adhering roof membrane 10 may be applied to a smooth asphalt top surface. If desired, the roofing system may also include an insulation barrier formed from polyisocyanarate or any other suitable material applied over the roof deck. A suitable primer may be used on the roof substrate surface to enhance the adhesion of the self adhering roof membrane.

The water impermeable membrane 12 of the preformed self adhering roofing membrane 10 is formed of, for example, appropriate thermosetting materials and thermoplastic materials including polyvinyl chloride (PVC), thermoplastic olefin (TPO), polyethylene and polypropylene, chlorinated polyethylene (CPE), chloro-sulphinated polyethylene (CSPE) and polyisobutylene (PIB). Suitable thermosetting materials are EPDM, butyl rubber, and neoprene. These preformed self adhering single ply roofing membranes 10 may or may not include reinforcing meshes or scrims located intermediate layers 12 and 14 of the material forming the single ply roofing membrane. The water impermeable membrane 12 may range from about 0.020–0.090 inches thick, preferably 0.045–0.090 inches thick.

The water impermeable membrane 12 may range from about 6 inches–12 feet wide and of indeterminate length depending upon the intended application. For example, when the preformed self adhering membrane 10 is installed over the parapet wall or curb of a roofing installation the water impermeable membrane ranges from 6 inches–3 feet in width and indeterminate in length as desired.

Adhered to one side of the water impermeable membrane 12 is the pressure sensitive, hot melt adhesive 14. The pressure sensitive, hot melt adhesive 14 is applied directly to the water impermeable membrane 12 using most any suitable method well known in the art. For example, the pressure sensitive, hot melt adhesive 14 may be applied directly to the water impermeable membrane 12 using a hot melt spray method or by using a slot die method as well know in the art. It will be appreciated that by applying the pressure sensitive, hot melt adhesive 14 directly to the water impermeable membrane 12 better and more uniform bond strength may be achieved in contrast to the use of a transfer adhesive.

Pressure sensitive, hot melt adhesives 14 in accordance with the present invention are solvent-free adhesives, that are characteristically solid at temperatures below 180 degrees F. (° F.), are low viscosity fluids above 180° F., and rapidly set upon cooling. Exemplary of pressure sensitive hot melt adhesives are ethylene vinyl acetate (EVA) copolymers, compatible with paraffin; styrene-isoprene-styrene (SIS) copolymers; styrene-butadiene-styrene (SBS) copolymers; ethylene ethyl acrylate copolymers (EEA); and polyurethane reactive (PUR), butyl or halo-butyl rubbers, acrylic, ethylene propylene rubber (EPR), ethylene propylene diene terpolymer rubber (EPDM) or styrene/butadiene rubbers (SBR) and styrene-ethylene-butene-styrene copolymers (SEBS) including a variety of tackifying resins, and optionally waxes, antioxidants, plasticizers, and other materials added to the adhesive formulation to enhance the polymer performance. In order to be considered useful for the preformed single ply roofing membrane 10 in accordance with the present invention, the pressure sensitive, hot melt adhesive 14 should not include a curing or cross linking agent whereby the adhesive maintains the desired thermoplastic properties. The pressure sensitive hot melt adhesive 14 must have a minimum peel strength of 0.5 pli at 70 degrees Fahrenheit as determined in accordance with ASTM D 3330 for roofing applications.

By way of a representative example only, a particular preferred pressure sensitive, hot melt adhesive 14 is PSA-3 Hot Melt Adhesive commercially available from ADCO Products, Inc.

The pressure sensitive, hot melt adhesive 14 thickness may range from about 0.004 inches to 0.015 inches.

A release liner 16 is applied against the pressure sensitive, hot melt adhesive 14 surface to prevent premature unwanted adhesion and, in the case of rolls, ease of unwind without sticking to the backing. The release liner 16 is applied after the application of the pressure sensitive hot melt adhesive 14. For ease of application, the release liner 16 may be sliced into multiple sections to allow for portioned release of the liner from the water impermeable membrane during application of the preformed self adhering membrane 10. The release liner 16 may comprise paper, or polyethylene, polypropylene or polyester films of a type well known in the art.

Figure 2:
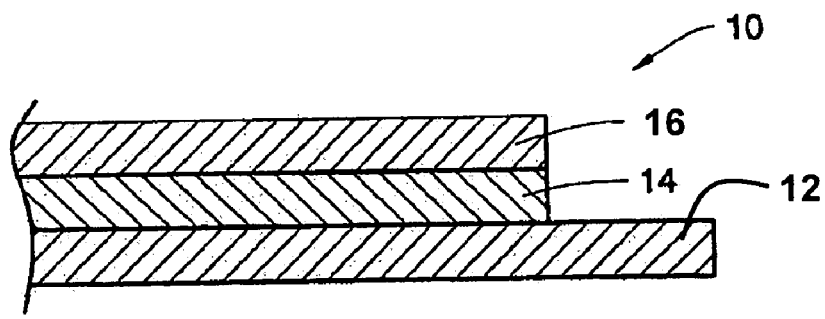
FIG. 2 is a cross sectional view of a preformed roofing membrane in accordance with another aspect of the present invention.
Figure 3:
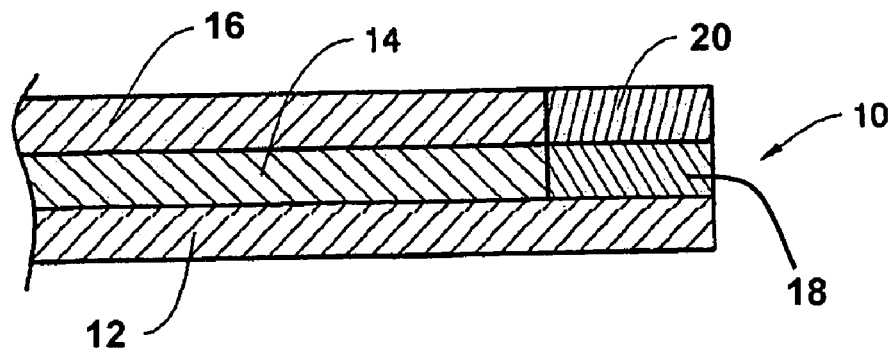
FIG. 3 is a preformed roofing membrane in accordance with another aspect of the present invention.

As shown in FIG. 1, the water impermeable membrane 12; pressure sensitive, hot melt adhesive 14 and release liner 16 may be co-extensive. During application, two self adhering membranes 10 may be joined by positioning the membranes in overlapping relation and then heat welding or adhesively bonding the overlapping edges or if the membranes are butted together, a cover cap may be adhered or hot air welded over the seam. In alternate embodiment, as shown in FIG. 2, the release liner 16 and pressure sensitive hot melt adhesive 14 may be coextensive and the combined release liner 16 and pressure sensitive adhesive 14 may be spaced from at least one marginal edge of the water impermeable membrane 12 to provide a free edge of water impermeable membrane. The free edge of water impermeable membrane 12 may overlap an adjacent water impermeable membrane and either be hot air welded or solvent based adhered or tape adhered to the overlapped membrane depending upon the type of water impermeable membrane to be joined. In yet another embodiment as shown in FIG. 3, the pressure sensitive, hot melt adhesive 14 and the release liner 16 may be coextensive and the combined release liner and pressure sensitive adhesive may be spaced from at least one marginal edge of the water impermeable membrane. The free edge of water impermeable membrane includes a cured, pressure sensitive adhesive composition 18 including a release liner as described in U.S. Pat. No. 5,242,727. The preformed self adhering membranes 10 may be joined together by overlapping the cured pressure sensitive adhesive 18 and the water impermeable membrane 12 and then removing a release liner 20 and pressing adhesive 18 of one membrane against the other membrane. overlapping the cured pressure sensitive adhesive 18 and the water impermeable membrane 12 and then removing the release liner and pressing the adhesive against the membrane.

The preformed self adhering membrane 10 as shown in the figures is joined to the roof substrate by removing the release liner 16 and then pressing the pressure sensitive, hot melt adhesive 14 directly to the roof substrate.

The patents and documents described herein are hereby incorporated by reference.

Having described presently preferred embodiments of the invention, the invention may be otherwise embodied within the scope of the appended claims.

While the invention has been specifically described in connection with certain specific embodiments thereof, it is to be understood that this is by way of illustration and not of limitation, and the scope of the appended claims should be construed as broadly as the prior art will permit.

What is claimed is:

1. A membrane product comprising:
a water impermeable membrane; and
a pressure sensitive, hot melt first adhesive adhered to one side of the water impermeable membrane, wherein the first adhesive is in direct contact with at least a portion of the water impermeable membrane, wherein the first adhesive is free of a curing additive, wherein the first adhesive has a thickness of 0.004 to 0.015 inches, wherein the membrane product is adhered to a portion of a building by the first adhesive, wherein the membrane product is self adhering, and wherein the water impermeable membrane is the outermost layer of the membrane product relative to the building.

2. The membrane product of claim 1, wherein the membrane is formed of a thermoplastic material.

3. The membrane product of claim 1, wherein the membrane is formed of a thermosetting material.

4. The membrane product of claim 3, wherein the thermosetting material is selected from EPDM, butyl rubber, and neoprene.

5. The membrane product of claim 1, wherein the water impermeable membrane ranges from 4.6 inches–12 feet wide.

6. The membrane product of claim 1, wherein the water impermeable membrane ranges from 6 inches–3 feet wide.

7. The membrane product of claim 1, wherein the first adhesive is a solvent-free adhesive.

8. The membrane product of claim 1, wherein the first adhesive is selected from ethylene vinyl acetate copolymers, compatible with paraffin; styrene-isoprene-styrene copolymers; styrene-butadiene-styrene copolymers; ethylene ethyl acrylate copolymers; and polyurethane reactive, butyl or halo-butyl rubbers, acrylic, ethylene propylene rubber (EPR), ethylene propylene diene terpolymer rubber (EPDM) or styrene/butadiene rubbers (SBR) and styrene-ethylene-butene-styrene copolymers.

9. The membrane product of claim 1, wherein the water impermeable membrane is single ply.

10. The membrane product of claim 1, wherein the membrane product is adhered to a roof deck.

11. The membrane product of claim 1, wherein the water impermeable membrane includes a reinforcing mesh located intermediate the adhesive and the water impermeable membrane and wherein the adhesive is in direct contact with the water impermeable membrane at openings in the reinforcing mesh.

12. A membrane product consisting essentially of:
a water impermeable membrane; and
a pressure sensitive, hot melt first adhesive adhered to one side of the water impermeable membrane, wherein the first adhesive is in direct contact with at least a portion of the water impermeable membrane, wherein the first adhesive is free of a curing additive, wherein the first adhesive has a thickness of 0.004 to 0.015 inches, —wherein the membrane product is adhered to a portion of a building by the first adhesive, and wherein the membrane product is self adhering.

13. The membrane product of claim 12, wherein the water impermeable membrane is the outermost layer of the membrane product relative to the building.

14. The membrane product of claim 12, wherein the membrane is formed of a thermoplastic material.

15. The membrane product of claim 12, wherein the membrane is formed of a thermosetting material.

16. The membrane product of claim 15, wherein the thermosetting material is selected from EPDM, butyl rubber, and neoprene.

17. The membrane product of claim 12, wherein the first adhesive is a solvent-free adhesive.

18. The membrane product of claim 12, wherein the first adhesive is selected from ethylene vinyl acetate copolymers, compatible with paraffin; styrene-isoprene-styrene copolymers; styrene-butadiene-styrene copolymers; ethylene ethyl acrylate copolymers; and polyurethane reactive, butyl or halo-butyl rubbers, acrylic, ethylene propylene rubber (EPR), ethylene propylene diene terpolymer rubber (EPDM) or styrene/butadiene rubbers (SBR) and styrene-ethylene-butene-styrene copolymers.

19. The membrane product of claim 12, wherein the water impermeable membrane is single ply.

20. The membrane product of claim 12, wherein the membrane product is adhered to a roof deck.

21. The membrane product of claim 12, wherein the water impermeable membrane includes a reinforcing mesh located intermediate the adhesive and the water impermeable membranes and wherein the adhesive is in direct contact with the water impermeable membrane at openings in the reinforcing mesh.

* * * * *